No. 704,677. Patented July 15, 1902.
A. COMBANAIRE & J. DE LA FRESNAYE.
PROCESS OF PURIFYING GUTTA PERCHA.
(Application filed Nov. 15, 1901.)
(No Model.)
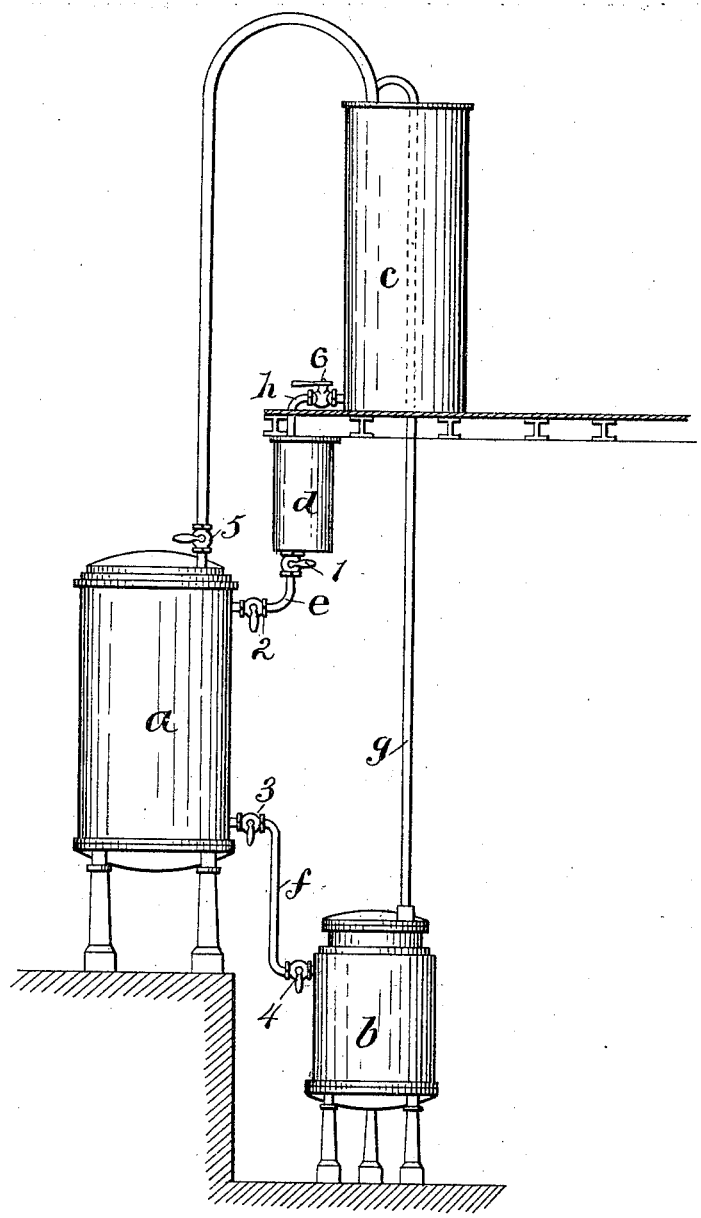
Witnesses
Geo. E. Frech
C. T. Middleton
By
Inventors
Adolphe Combanaire
Jean de la Fresnaye
Richards & Co
Attorneys

UNITED STATES PATENT OFFICE.

ADOLPHE COMBANAIRE AND JEAN DE LA FRESNAYE, OF PARIS, FRANCE.

PROCESS OF PURIFYING GUTTA-PERCHA.

SPECIFICATION forming part of Letters Patent No. 704,677, dated July 15, 1902.

Application filed November 15, 1901. Serial No. 82,406. (No specimens.)

*To all whom it may concern:*

Be it known that we, ADOLPHE COMBANAIRE, of 65 Rue du Chateau d'Eau, and JEAN DE LA FRESNAYE, of 49 Rue du Borrego, Paris, in the Republic of France, have invented a certain new and useful Improved Process for the Purification of Gutta-Percha; and we do hereby declare the following to be a full, clear, and exact description of the invention, such as will enable others skilled in the art to which it appertains to make and use the same.

This invention relates to a process for the purification of gutta-percha or, more exactly speaking, to a process for the abstraction of resin from this material. Resin is one of the worst impurities of gutta and the quality of the gutta or the possibility of its use in manufactures, such as in the making of submarine cables, consequently in the inverse ratio to the amount of resin it contains. Until now the resin contained in the raw gutta-percha has been eliminated in the following way: The gutta-percha is boiled in a suitable liquid which entirely dissolves it. When the dissolution is complete, the resin is separated out by cooling or by precipitation in alcohol. This process has not only the double inconvenience of requiring a large quantity of the solvent and a very high temperature, but besides this the dissolving of the principal components of the gutta-percha—namely, its hydrocarbon constituents—has the effect of destroying its cellular construction and removing from the finished product its most valuable qualities. The treatment of gutta-percha with hot alcohol has also been tried, but the process cannot be described as an industrial one. The process we have invented does away with all these disadvantages. It consists in principle in treating the raw gutta-percha in a special solvent with suitable conditions of time and temperature in such a way that the resin alone is dissolved, the hydrocarbon compounds and other chief components are not touched, and thus the cellular construction undergoes no alteration. Thus if gutta-percha be treated in petroleum or its derivatives and raised to a temperature of not more than 35° centigrade the resin is alone dissolved. This resin can then be directly separated with the solvent by ordinary decantation. We describe as a representative example a method of carrying this into effect, and on the accompanying drawing we show the complete arrangement of an apparatus for the industrial application of our process.

The material from which the resin is to be abstracted having first been reduced to fragments is placed in a receptacle $a$ or mixing-chamber with a false bottom, heated by a helical steam-coil or any other suitable heating appliance. The receptacle $a$ communicates in its upper portion with a reservoir $d$, containing the solvent, by a pipe $e$, in which there are two stop-cocks 1 and 2. In its lower portion the receptacle $a$ communicates with a collecting vessel $b$ by a pipe $f$, in which there are two stop-cocks 3 and 4. A pipe $g$, leading from the top of the collector $b$, opens into the upper portion of a still $c$, which is joined in its lower portion by a pipe $h$ to the reservoir $d$ and by a pipe $i$ to the receptacle $a$. The pipes $i$ and $h$ are fitted, respectively, with stop-cocks 5 and 6. The gutta-percha reduced to fragments having been placed in the receptacle $a$ and the stop-cock 5 closed, the stop-cocks 1 and 2 are opened and the receptacle is filled with the solvent liquid in such a way that the gutta-percha is entirely immersed. The temperature of the gutta-percha is now gradually raised to about 35° centigrade. A window at the side will permit the operation to be watched. Care must be taken to prevent the solvent from becoming colored. So long as it remains colorless only resin is being dissolved. The partial dissolution of the material may take any length of time, not less than twenty-five minutes. The length of the operation depends on the quality of the material being treated. Any discoloration of the solvent is a sign that the principal essential components of the gutta-percha are beginning to dissolve. The operation can also be performed by means of successive lixiviations more or less prolonged either open to the atmosphere or under pressure always under the same conditions of temperature and duration to avoid coloration of the solvent. The stop-cocks 3 and 4 are now opened and the solvent containing the resin is allowed to run through the false bottom into the collector $b$, the undissolved gutta-percha remaining in the receptacle $a$. Then the stop-cock 4 having been closed, the solvent is recovered by distillation into the still $c$. The resin remains in the collector from whence it is removed in some suitable way. The solvent remaining with the gutta-percha is recovered through the pipe $i$ in the still $c$, from whence it returns with that already recovered from $b$ through the pipe $h$ into the reservoir $d$.

The gutta-percha obtained from this apparatus may after having undergone the usual mechanical treatment be used in all manufactures especially in the making of submarine cables. It is free from all harmful excess of resin and nevertheless retains all its original texture. If the first treatment by the process described is not sufficient to free the gutta-percha from resin, the material can of course be submitted to several similar successive operations and a gutta-percha almost entirely chemically pure can thus be obtained.

What we claim is—

A process of purification of, or the abstraction of resin from, gutta-percha, consisting of treating the gutta-percha, previously reduced to fragments, in a solvent such as petroleum or one of its derivatives, at a temperature about 35° centigrade of stopping the operation before any coloration of the solvent takes place so that the resin only is dissolved and the cellular construction and principal essential components of the gutta are neither dissolved nor destroyed.

In witness whereof we have hereunto set our hands in the presence of two witnesses.

ADOLPHE COMBANAIRE.
JEAN DE LA FRESNAYE.

Witnesses:
LOUIS GARDET,
EDWARD P. MACLEAN.